United States Patent [19]
Jones

[11] 4,417,199
[45] Nov. 22, 1983

[54] ZERO CROSSOVER TRIGGERING CIRCUIT FOR THYRISTOR

[75] Inventor: Thaddeus M. Jones, Mishawaka, Ind.

[73] Assignee: Dresser Industries, Inc., Dallas, Tex.

[21] Appl. No.: 377,744

[22] Filed: May 13, 1982

[51] Int. Cl.³ .............................................. G05B 24/02
[52] U.S. Cl. .............................. 323/319; 307/252 UA; 323/300; 323/903
[58] Field of Search ................ 307/252 UA; 323/235, 323/237, 282, 288, 300, 319, 320, 903

[56] References Cited

U.S. PATENT DOCUMENTS

| | | | |
|---|---|---|---|
| 3,577,177 | 5/1971 | Hewlett, Jr. .......................... | 323/235 |
| 3,745,749 | 7/1973 | Gelfand ............................ | 323/903 X |
| 3,921,058 | 11/1975 | Tanaka et al. ....................... | 323/300 |
| 4,267,502 | 5/1981 | Reese et al. ...................... | 323/903 X |
| 4,308,494 | 12/1981 | Gelfand et al. .................. | 323/903 X |
| 4,377,739 | 3/1983 | Eckert, Jr. et al. ............ | 323/235 X |

*Primary Examiner*—William M. Shoop

*Attorney, Agent, or Firm*—Daniel Rubin

[57] ABSTRACT

A power circuit for a precipitator utilizes a pair of silicon controlled rectifiers (SCR's) which are triggered by detecting the zero crossover of a power signal. The power transmitted through the SCR's is determined by the time period from the detection of the zero crossover to the generation of the trigger signal. Power signals are typically subject to noise which interferes with the detection of the zero crossover. Filters are provided for reducing the noise interference but function without altering the phase relation of the zero crossover of the filtered signal in respect to the unfiltered power signal. A pulse train of higher frequency than the power signal is generated to provide a plurality of triggering pulses for the SCR. Further, phase control signals are generated for each SCR to prevent the generation of trigger pulses when the SCR's are reverse biased. Thus, the present invention provides a precision voltage control for a power supply circuit which is particularly applicable for powering an electrostatic precipitator.

17 Claims, 5 Drawing Figures

ZERO CROSSOVER TRIGGERING CIRCUIT FOR THYRISTOR

TECHNICAL FIELD

The present invention pertains to electronic circuits and more particularly to phase control circuits for thyristor power supplies.

BACKGROUND OF THE INVENTION

Variable voltage power supply circuits frequently utilize SCR's and triacs which are triggered at selected times during a power signal cycle. The power transmitted through the SCR or triac is dependent on the portion of the power supply cycle which is transmitted through the device. The time of triggering the device is typically based upon the zero crossover as a reference. Therefore, the accuracy of the voltage control is substantially dependent upon the determination of the time of zero crossover. However, power signals frequently carry substantial noise interference and this interference can disrupt the determination of the zero crossover. Interference can cause early or late triggering, thereby making the voltage produced by the power supply greater or less than that desired. The power signal can be filtered to eliminate high frequency interference but the filtering process introduces substantial phase error which can further add to the difficulty in determining the true zero crossover.

In view of the problems of noise and phase shift encountered in the triggering of SCR type power components and the need to produce accurate voltages, particularly in high voltage applications, there exists a need for a power supply circuit for accurately and consistently determining the zero crossover of a power signal which can be subjected to substantial noise interference.

SUMMARY OF THE INVENTION

The present invention relates to a power supply which utilizes a zero crossover detector for triggering a thyristor power element, such as an SCR. A particular application of the present invention is the powering of an electrostatic precipitator which requires an accurately controlled high voltage.

The particular embodiment of the present invention comprises a circuit for triggering a thyristor relative to a zero crossover of a power signal wherein the circuit includes a low pass filter which is connected to receive the power signal and pass the power signal therethrough, the filter providing a 180° phase shift and producing a filtered power signal. A circuit means is connected to receive the filtered power signal and generate a pulse at the zero crossover of the filtered power signal. A waveform generator is connected to receive the pulse and produce a sweeping voltage signal upon receipt of each pulse. A comparator circuit is connected to receive a variable amplitude command signal and the sweeping voltage signal to generate a gate signal upon detecting a comparison between the command signal and the sweeping voltage signal. Further circuit means is provided which is responsive to the gate signal and operates to trigger the thyristor.

It is therefore an object of the invention to provide power circuit apparatus which is capable of accurately determining zero crossover of an AC power signal despite the presence of interfering noise.

It is a further object of the invention to provide a novel and inexpensive power circuit capable of being utilized for triggering SCR's in a high voltage power supply capable of driving an electrostatic precipitator apparatus.

DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
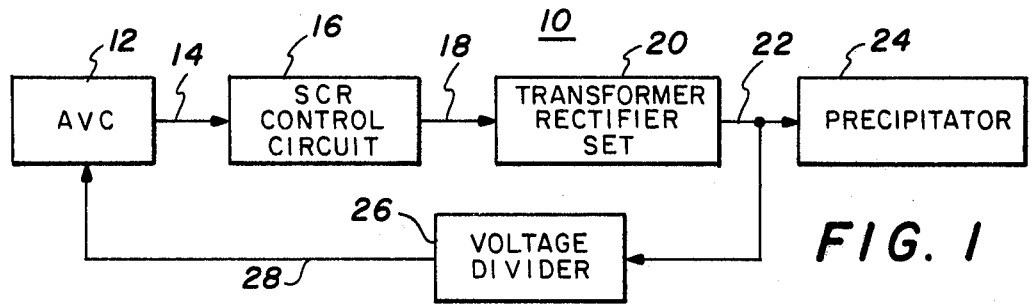
FIG. 1 is a block diagram of an electrostatic precipitator apparatus which employs the present invention.

Referring now to FIG. 1 there is illustrated a block diagram of an electrostatic precipitator apparatus showing in particular the functional units which make up the power supply for the precipitator. The apparatus as a whole is designated generally by the reference numeral 10. An automatic voltage control (AVC) circuit 12 receives a conventional AC power signal and serves to regulate the amplitude of the power signal. This regulated power signal is transmitted through a line 14 to an SCR control circuit 16. This control circuit is described in detail in FIG. 4. A chopped power signal is transmitted from circuit 16 through a line 18 to a transformer-rectifier set 20. The set 20 boosts the power signal voltage to the range of 40–50 Kv and then rectifies this high voltage signal. The high voltage DC signal thus produced is transmitted through a line 22 to a precipitator 24. The precipitator 24 serves to remove particulate matter from flow streams such as, for example, the stack gases from fossil fuel power plants. The high voltage DC signal is further transmitted through a voltage divider circuit 26 which produces a control signal that is transmitted through a line 28 back to the AVC 12. This feedback signal serves to control the AVC and provide regulation for the power signal transmitted through line 14.

Figure 2:
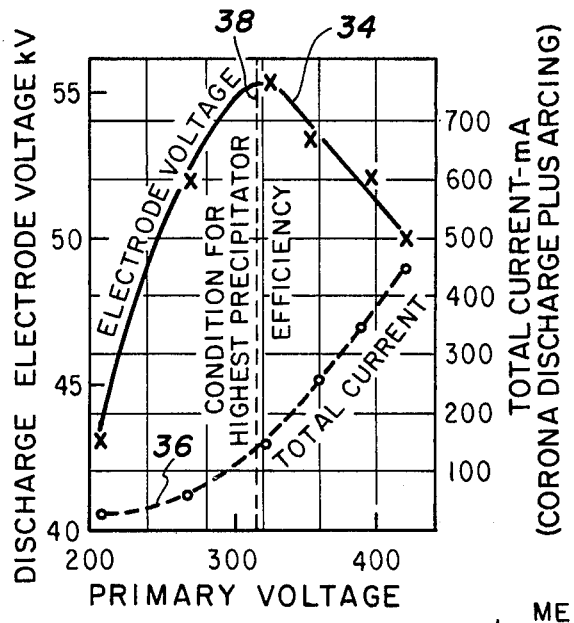
FIG. 2 is a graph illustrating the electrical characteristics of an electrostatic precipitator.
Figure 3:
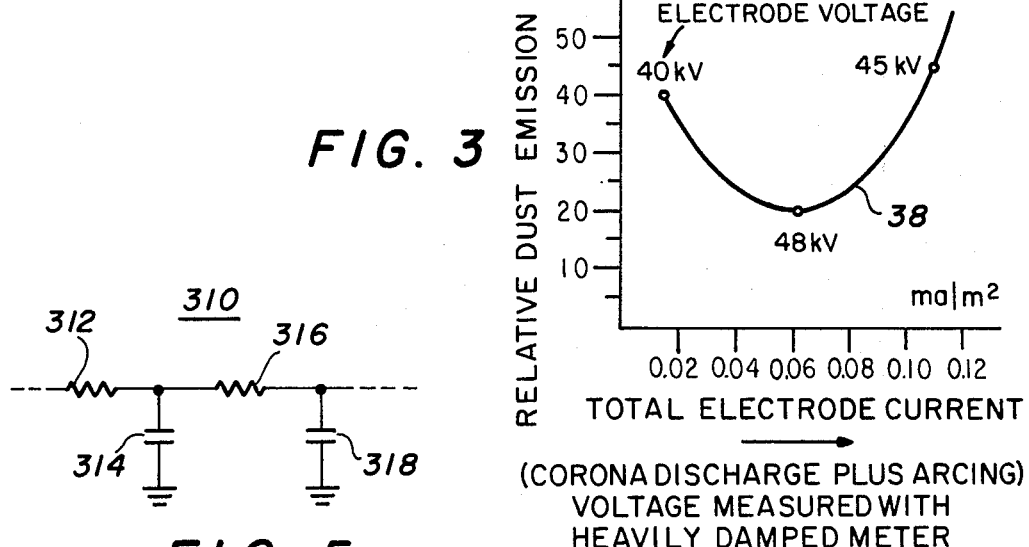
FIG. 3 is a graph illustrating relative dust emission as a function of applied voltage and current for an electrostatic precipitator.

The precipitator 24 can be, for example, a unit, manufactured by Lodge-Cottrell. The electrical and dust emission characteristics for a representative precipitator are illustrated in FIGS. 2 and 3. The graph in FIG. 2 shows the relationship of the primary voltage, the voltage applied to the transformer rectifier set 20, and the corresponding electrode voltage of the precipitator 24, by means of a line 34. The relationship of the primary voltage and the total precipitator current is shown as a dashed line 36. A vertical line 38 shows the condition for highest precipitator efficiency. Note that the electrode voltage must be maintained within a relatively narrow range in order to keep the precipitator operating at peak efficiency.

Referring now to FIG. 3 there is illustrated the relative dust emission versus total electrode current as shown by line 38. Note that the dust emission is reduced as a function of the electrode voltage and that the optimum efficiency requires that the electrode voltage be accurately controlled at a peak value.

In view of the information shown in FIGS. 2 and 3, it can be seen that the performance of an electrostatic precipitator is dependent upon the accurate control of the precipitator electrode voltage. In typical SCR power supplies, the voltage is determined by the time interval from the zero crossover of the power signal to the triggering signal provided to the SCR. Most power signals are subject to noise interference and it is often difficult to make an accurate determination of the zero crossover. The error caused by an inaccurate determination of the zero crossover can seriously alter the resulting voltage produced by the SCR power supply, which in turn can substantially degrade the performance of the electrostatic precipitator.

Figure 4:
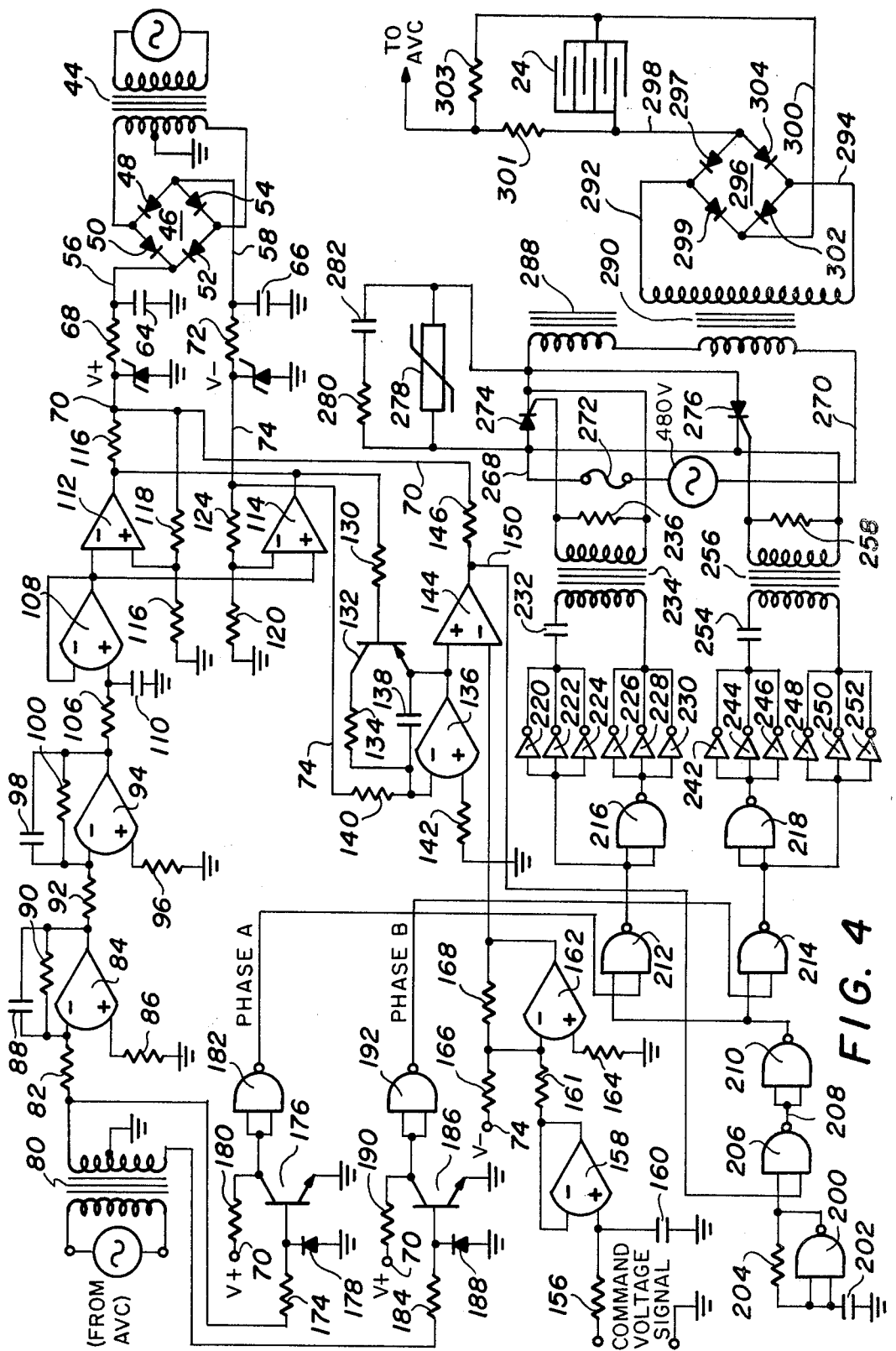
FIG. 4 is a schematic illustration of the power supply circuit and precipitator apparatus of the present invention.

Referring now to FIG. 4 there is illustrated a schematic diagram of a power supply circuit for triggering an SCR at an accurate time interval relative to the zero crossover of a power signal despite the presence of noise imposed upon the power signal. The circuit of FIG. 4 includes a power supply for producing positive and negative supply voltages for use by the other components of the circuit. An AC power signal, typically 50–60 cycles at 120 volts is input to the primary winding of a transformer 44. The terminals of the secondary winding of transformer 44 are connected to a full-wave rectifier 46. The secondary winding of the transformer has a grounded center tap. Rectifier 46 comprises diodes 48, 50, 52 and 54. The cathode of diode 48 and the anode of diode 50 are connected to a first terminal of the secondary winding of transistor 54 and the cathode terminal of diode 54, together with the anode terminal of diode 52, are connected to the remaining terminal of the secondary winding. The cathodes of diodes 50 and 52 are connected to a node 56 and the anodes of diodes 48 and 54 are connected to a node 58. A filter capacitor 64 is connected between node 56 and ground. A filter capacitor 66 is connected between node 58 and ground. A resistor 68 is connected between node 56 and a node 70. A supply voltage noted as V+ is produced at node 70. A resistor 72 is connected between node 58 and a node 74. A supply voltage noted as V− is produced at node 74.

Further referring to FIG. 4, the regulated power signal from the AVC 12, shown in FIG. 1, is input to the primary winding of a transformer 80. A first terminal of the secondary winding of transformer 80 is connected to a resistor 82 which is in turn connected to the inverting input of an operational amplifier 84. The secondary winding of transformer 80 has a grounded center tap.

A resistor 86 is connected between the noninverting input of amplifier 84 and ground. A capacitor 88 is connected between the output and inverting input of amplifier 84. A resistor 90 is connected in parallel with capacitor 88. The operational amplifier 84, together with the associated circuitry functions as a low pass filter to substantially reduce the amplitude of noise having a higher frequency than the power signal. The operational amplifier further provides essentially a 90° phase shift for the power signal passing therethrough.

A resistor 92 is connected between the output of operational amplifier 84 and the inverting input of an operational amplifier 94. A resistor 96 is connected between the noninverting input of amplifier 94 and ground. A capacitor 98 is connected between the output and inverting input of amplifier 94. A resistor 100 is connected in parallel with capacitor 98. The operational amplifier 94, together with its associated components, functions as a low pass filter to further reduce the amplitude of noise interference having a frequency greater than that of the power signal. The operational amplifier further provides approximately a 90° phase shift for the power signal passed therethrough.

A resistor 106 is connected between the output of amplifier 94 and the noninverting input of an operational amplifier 108. A capacitor 110 is connected between ground and the noninverting input of amplifier 108. The output and inverting input of amplifier 108 are connected together. The RC circuit comprising resistor 106 and capacitor 110 are utilized to make a small phase adjustment for the power signal passed through operational amplifiers 84 and 94 such that the phase shift of the power signal at the output of amplifier 94 is very close to 180°. Amplifier 108 functions as a buffer for the RC circuit comprising resistor 106 and capacitor 110.

The operational amplifiers 84 and 94, with their associated circuitry, as well as the RC circuit 106, 110, together comprise a low pass filter for producing a 180° phase shift between the signal provided by the transformer 80 and the filtered signal at the output of amplifier 108.

The filtered power signal is input to circuitry which produces a pulse that is centered at the zero crossover of the filtered power signal. The output of amplifier 108 is provided to the inverting input of a comparator 112 and the noninverting input of a comparator 114. The outputs of comparators 112 and 114 are connected in common. A resistor 116 is connected between the outputs of comparators 112 and 114 and the V+ node 70.

A pair of series connected resistors 116 and 118 are connected between the V+ node 70 and ground. The junction of these resistors is connected to the noninverting input of comparator 112. A series pair of resistors 120 and 124 are connected between the V− node 74 and ground. The junction of these two resistors is connected to the inverting input of comparator 114.

The impedances of the voltage divider resistors 116 and 118 and the voltage divider resistors 120 and 124 are selected such that a pulse is generated at the output of comparators 112 and 114 with the leading edge of the pulse occurring approximately 100 microseconds before the zero crossing of the power signal at the output of amplifier 108 and the trailing edge of the pulse occurring approximately 100 microseconds after the zero crossing of the power signal. The pulse thus generated at the output of the comparators 112 and 114 is transmitted through a resistor 130 to the base terminal of a PNP transistor 132. A resistor 134 is connected between the collector terminal of transistor 132 and the inverting input of an operational amplifier 136. The emitter terminal of transistor 132 is connected to the output of an amplifier 136. A capacitor 138 is connected between the output and inverting input of amplifier 136. A resistor 140 is connected between node 74 and the inverting input of amplifier 136. A resistor 142 is connected between the noninverting input of amplifier 136 and ground.

The operational amplifier 136, together with its associated circuitry serves as a waveform generator to produce a ramp voltage signal at the output thereof. The ramp voltage signal is one particular type of sweep voltage signal that can be produced for the operation of the present invention. The transistor 132 is rendered conductive by the pulse produced by the comparators 112 and 114 to discharge the capacitor 138. The discharge of capacitor 138 serves to initiate a new cycle of generating the ramp voltage signal by operation of the amplifier 136. The ramp voltage signal produced by amplifier 136 is provided to the noninverting input terminal of a comparator 144. A resistor 146 is connected between the V+ node 70 and the output of comparator 144. The output of comparator 144 is designated as node 150.

A command voltage signal is provided to the power supply circuit in FIG. 4 to adjust the voltage provided to the precipitator. This command signal is transmitted through a resistor 156 to the noninverting input terminal of an operational amplifier 158. A capacitor 160 is connected between the noninverting input terminal of amplifier 158 and ground. The resistor 156 and capacitor 160 serve to fitler noise from the command signal which is passed therethrough. The output and inverting input of amplifier 158 are connected together. Amplifier 158 serves as a buffer to provide high input impedance for the command signal as well as isolation from the remainder of the circuit.

The command signal from amplifier 158 is passed through a resistor 161 to the inverting input of an operational amplifier 162. A resistor 164 is connected between the noninverting input of amplifier 162 and ground. A resistor 166 is connected between the inverting input terminal of amplifier 162 and the V— power terminal at node 74. A resistor 168 is connected between the output and the inverting input of amplifier 162. The operational amplifier 162, together with its associated circuitry, serves as an inverter and level shifter to provide the desired amplitude of command signal at the output of amplifier 162. This output is connected to the inverting input of the comparator 144. When the command voltage signal is 0, the output of amplifier 162 is at a maximum. When the command voltage signal is at its minimum value, the output of amplifier 162 is 0.

The comparator 144 thus receives the sweep voltage, ramp signal, from the amplifier 136 and the command signal from the amplifier 162. When the amplitudes of these two signals are equal, a gate signal is generated at node 150 and this gate signal is utilized, through additional circuitry, to trigger the SCR's in the power supply. The amplitude of the command voltage signal can be changed to vary the time delay between the zero crossover of the power signal and the initiation of the trigger signal for the SCR's. This operation serves to adjust the voltage which is applied to the precipitator.

Further referring to FIG. 4, there are produced phasing signals for preventing the triggering of the SCR's when they are reversed biased. A first terminal of the secondary coil of transformer 80 is connected to a resistor 174 which is in turn connected to the base terminal of an NPN transistor 176. A diode 178 has the anode terminal thereof grounded and the cathode terminal thereof connected to the base terminal of transistor 176. A resistor 180 is connected between the collector terminal of transistor 176 and the V+ terminal at node 70. The collector terminal of transistor 176 is further connected to the two input terminals of a NAND gate 182. The emitter terminal of transistor 176 is grounded. The output from gate 182 is a phase A signal for preventing triggering of an SCR, as described below.

The second terminal of the secondary winding of transformer 80 is connected to a resistor 184 which is in turn connected to the base terminal of an NPN transistor 186. The emitter terminal of transistor 186 is grounded. A diode 188 has the anode terminal thereof grounded and the cathode terminal thereof connected to the base terminal of transistor 186. A resistor 190 is connected between the collector terminal of transistor 186 and the V+ power terminal at node 70. The collector terminal is further connected to the two inputs of a NAND gate 192 which produces a phase B signal for preventing triggering of a reverse biased SCR, as described below.

A NAND gate 200 has the inputs thereof connected together. A capacitor 202 is connected between these inputs and ground. A resistor 204 is connected between the output of gate 200 and the inputs. The gate 200, together with the associated circuitry is an astable multivibrator which produces a pulse train at a rate that is greater than the frequency of the power signal provided to the circuit. The pulse train from gate 200 is provided to the first input of a NAND gate 206. The gate signal at node 150 is connected as the second input to the gate 206. Thus, the pulse train from gate 200 is passed through gate 206 when the gate signal at node 150 is in the active state. This gated pulse train is passed through a line 208 to both of the inputs of a NAND gate 210, which functions as an inverter.

The output from gate 210 is provided as the first inputs to NAND gates 212 and 214. The phase A signal from gate 182 provides a second input to gate 212. The phase B signal from gate 192 provides a second input to gate 214.

The output from gate 212 is provided to both of the inputs of a NAND gate 216 which serves as an inverter. The output of gate 214 is provided to both of the inputs of a NAND gate 218. The output from gage 212 is further provided to each of the inputs of inverters 220, 222 and 224. The outputs of these inverters are tied together. The output from gate 216 is provided as the input to inverters 226, 228 and 230. The outputs of these inverters are tied together. A capacitor 232 is connected between the outputs of inverters 220, 222 and 224 and a first terminal of a primary winding of a transformer 234. The second terminal of the primary winding of transformer 234 is connected to the outputs of inverters 226, 228 and 230. A resistor 236 is connected between the terminals of the secondary winding of transformer 234.

Each of the NAND gates shown in FIG. 4 is a Schmidt trigger type circuit.

The output from gate 218 is connected to the inputs of inverters 242, 244 and 246. The outputs of these inverters are tied together. The input to gate 218 is connected to the inputs of inverters 248, 250 and 252. The outputs of these inverters are connected in common.

A capacitor 254 is connected between the outputs of inverters 242, 244 and 246 and a first terminal of a primary winding of a transformer 256. The second terminal of the primary winding of transformer 256 is connected to the outputs of inverters 248, 250 and 252.

A resistor 258 is connected between the terminals of the secondary winding of transformer 256.

An AC power signal is input between terminals 268 and 270 to supply the power to the precipitator. In one embodiment, this power signal is 480 volts at 60 cycles. This power signal is in phase with the power signal provided to transformer 80. A fuse 272 is connected serially in the line from the power source to limit the maximum current. An SCR 274 has the anode terminal thereof connected to fuse 272, the gate terminal thereof connected to the first terminal of the secondary winding of transformer 234 and the cathode terminal thereof connected to the second terminal of the secondary winding of transformer 234. An SCR 276 has the anode terminal thereof connected to the cathode terminal of SCR 274, the gate terminal thereof connected to the first terminal of the secondary winding of transformer 256 and the cathode terminal thereof connected to the second terminal of the secondary winding of transformer 256.

A metal oxide varistor 278 is connected in parallel with the SCR's 274 and 276 to limit the instantaneous peak voltage across the SCR's to a value less than that of their maximum blocking rating. The series combination of a resistor 280 and a capacitor 282 is connected in parallel with the varistor 278 to limit the maximum rate of change of voltage across the SCR's 274 and 276.

An inductor 288 is connected between the junction of the cathode of SCR 274 and anode of SCR 276 and the first terminal of the primary winding of a transformer 290. The second terminal of the primary winding of transformer 290 is connected to the node 270. The secondary winding of transformer 290 is connected to nodes 292 and 294 which are in turn connected to a full-wave rectifier 296. Rectifier 296 comprises diodes 297, 299, 302 and 304. Node 292 is connected to the cathode of diode 297 and the anode of diode 299. Node 294 is connected to the anode of diode 302 and the cathode of diode 304. A power terminal 298 of the precipitator 24 is connected to the anode terminals of diodes 297 and 304. A power terminal 300 of the precipitator 24 is connected to the cathode terminals of diodes 300 and 302.

A series pair of resistors 301 and 303 are connected between power terminals 298 and 300. Resistors 301 and 303 correspond to voltage divider 26. The junction of the resistors 301 and 303 is connected to the AVC unit 12 shown in FIG. 1 to provide the feedback voltage signal for regulating the output of the AVC 12.

Figure 5:
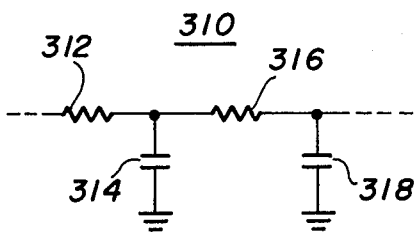
FIG. 5 is a schematic illustration of a passive low pass filter which can be substituted in place of the active low pass filter shown in FIG. 4.

Referring now to FIG. 5 there is shown a two-section low pass filter 310. The filter 310 can be utilized in place of the active low pass filter comprising operational amplifiers 84 and 94 shown in FIG. 4. Filter 310 comprises a series resistor 312 and a parallel capacitor 314. The capacitor 314 is connected between a terminal of resistor 312 and ground. A series resistor 316 is connected between the junction of resistor 312 and capacitor 314 and the first terminal of the capacitor 318. The second terminal of capacitor 318 is connected to ground. The low pass filter 310 is configured to provide essentially a 180° phase shift in the same manner as the low pass filter shown in FIG. 4.

Operation of the circuit and apparatus of the present invention is now described in reference to FIG. 4. A noisy AC power signal is passed through transformer 80 through operational amplifiers 84 and 94 which function as a low pass filter that substantially reduces the higher frequency noise interference. This filter circuit is designed to provide a 180° phase shift. The final adjustment of the phase shift is provided by the RC circuit comprising resistor 106 and capacitor 110. Buffering for this RC combination is provided by the operational amplifier 108. Thus, at the output of amplifier 108 there is a filtered power signal having a 180° phase shift from the input power signal. These signals have time coincident zero crossovers.

The combination of comparators 112 and 114, together with the associated circuitry comprises a pulse generator circuit. The leading and trailing edges of the pulses are established by the impedances of resistors 116, 118, 120 and 124. A fixed DC level is input to the noninverting terminal of comparator 112 and the inverting terminal of comparator 114. These DC values are slightly offset from the amplitudes of the power signal at the zero crossover point. These comparators comprise an OR function. A pulse is generated which preferably has the leading edge approximately 100 microseconds before the zero crossover and a trailing edge approximately 100 microseconds after the zero crossover. The pulse is preferably centered at the zero crossover of the power signal.

The operational amplifier 136, together with the capacitor 138 functions as a ramp generator in the charging of capacitor 138. The ramp signal is reset each time that transistor 132 is rendered conductive by the pulse produced at the output of comparators 112 and 114. The amplitude of the ramp produced by amplifier 136 is thus proportional to the time period following the zero crossover.

The command voltage signal for controlling the voltage applied to the precipitator 24 is input to an operational amplifier 158. This amplifier functions as a buffer. The command signal is further passed through an operational amplifier 162 which functions as an inverter and level shifter. The inverted command signal is then input to the comparator 144 which also receives the ramp signal from the amplifier 136. The comparator 144 generates a gate signal which is in the active state when the inverted command signal and ramp are equal in amplitude. Thus, the gate signal goes to the active state at a time delay period following the zero crossover where the time delay is determined by the amplitude of the command voltage signal.

The NAND gate 200 and associated circuitry functions as an oscillator to produce a pulse train to provide multiple triggering of the SCR's during each power signal cycle. The pulses are gated through NAND gate 206 by operation of the gate signal from comparator 144.

The NAND gate 210 functions as an inverter.

Phase blanking signals, designated phase A and phase B, are produced at the output of NAND gates 182 and 192. These phase signals serve to prevent applying triggering pulses to the SCR's when they are in the blocking mode. The phase signals, A and B, are input to NAND gates 212 and 214 and serve to block the pulse train when triggering pulses should not be applied to the SCR's.

The NAND gates 216 and 218 function as inverters. The inverters 220-230 and 242-252 are arranged in groups of three's to provide greater current drive. The group of inverters 220-224 and 226-230 are driven in a push-pull configuration. Capacitors 232 and 254 serve as DC blocks. The two groups of inverters 242-246 and 248-252 likewise function as push-pull drivers.

The signals for triggering the SCR's 274 and 276 are generated at the secondary coils of transformers 234 and 256. A gated pulse train is applied to each of these SCR's to render the SCR's conductive during the desired portion of a power cycle.

The power signal gated through the SCR's is filtered by the inductor 288 and passed through the primary winding of the step-up transformer 290. A high voltage output, on the order of 40-50 Kv, is produced at the secondary winding of transformer 290. This high voltage signal is full-wave rectified by operation of rectifier 296 to produce a high voltage DC power signal which is applied to the electrode terminals of precipitator 24.

The DC power signal provided to precipitator 24 is monitored by the voltage divider resistors 301 and 303 to produce a control signal which is returned to the precipitator 12.

In summary, the present invention is a power supply circuit for providing an accurately selectable high voltage DC power signal which is particularly suited for driving an electrostatic precipitator.

I claim:

1. A circuit for triggering a thyristor relative to a zero crossover of a power signal, comprising:
    a low pass filter connected to receive said power signal and pass said power signal therethrough, said filter providing a predetermined phase shift and producing a filtered power signal,
    means connected to receive said filtered power signal to generate a pulse at the zero crossover of said filtered power signal,
    a waveform generator connected to receive said pulse for producing a sweeping voltage signal upon receipt of said pulse,
    a comparator circuit connected to receive a command signal and said sweeping voltage signal to generate a gate signal upon detecting a comparison of said command signal and said sweeping voltage signal, and
    means responsive to said gate signal for triggering said thyristor.

2. The circuit recited in claim 1 wherein said predetermined phase shift provided by said low pass filter is a 180 degree phase shift.

3. The circuit recited in claim 1 wherein said low pass filter comprises serially connected first and second active sections each providing a 90 degree phase shift for said power signal.

4. The circuit recited in claim 1 wherein said low pass filter comprises serially connected first and second passive RC sections each providing a 90 degree phase shift for said power signal.

5. A circuit for triggering a thyristor relative to a zero crossover of a power signal, comprising:
    a low pass filter connected to pass said power signal therethrough to produce a filtered power signal,
    means connected to receive said filtered power signal for generating a pulse at the zero crossover of said filtered power signal,
    a waveform generator connected to receive said pulse and generate a ramp voltage signal upon receipt of said pulse,
    a comparator circuit connected to receive a command signal and said ramp voltage signal to generate a gate signal upon an amplitude comparison of said command signal and said ramp voltage signal, and
    means for triggering said thyristor upon receipt of said gate signal.

6. The circuit recited in claim 5 wherein said low pass filter provides a 180 degree phase shift for said power signal passed therethrough.

7. A circuit for triggering a plurality of silicon controlled rectifiers (SCR's) relative to a zero crossover of a power signal, comprising:
    a low pass filter connected to pass said power signal therethrough to produce a filtered power signal,
    means connected to receive said filtered power signal for generating a pulse at the zero crossover of said filtered power signal,
    a ramp generator circuit connected to generate a ramp voltage signal upon receipt of said pulse,
    a comparator circuit connected to receive a command signal and said ramp voltage signal to generate a gate signal upon detecting a correspondence between said command signal and said ramp voltage signal,
    means for generating a phase control signal for each of said SCR's, each of said phase control signals in an active state when the corresponding SCR is reverse biased,
    an oscillator for generating a pulse train at a rate greater than the frequency of said power signal,
    means connected to receive said gate signal, said phase control signals and said pulse train for generating a triggering signal therefrom for each of sad SCR's wherein each said triggering signal occurs upon the concurrent occurrence of said gate signal and a pulse of said pulse train in the absence of the active state of the phase control signal for the corresponding SCR, and
    means for applying said trigger signals respectively to said SCR's.

8. A power supply circuit for an electronic precipitator, comprising:
    a full-wave rectifier having the output terminals thereof connected to the power terminals of said precipitator,
    a transformer having the output terminals thereof connected to the input terminals of said full-wave rectifier,
    a thyristor connected to the input terminals of said transformer,
    a low pass filter connected to receive a power signal and pass said power signal therethrough with a predetermined phase shift to produce a filtered power signal,
    means connected to receive said filtered power signal to generate a pulse at the zero crossover of said filtered power signal,
    a voltage generator for producing a sweeping voltage signal upon receipt of said pulse,
    a comparator circuit connected to receive a command signal and said sweeping voltage signal to generate a gate signal upon detecting a comparison of said command signal and said sweeping voltage signal, and
    means for triggering said thyristor upon receipt of said gate signal to provide electrical power to said precipitator.

9. The power supply circuit recited in claim 8 wherein said predetermined phase shift provided by said low pass filter is a 180 degree phase shift.

10. A method for triggering a thyristor relative to a zero crossover of a power signal, the method comprising the steps of:
    passing said power signal through a low pass filter to provide a predetermined phase shift for said power signal and produce a filtered power signal,
    generating a pulse at the zero crossover of said filtered power signal,
    generating a sweeping voltage signal in response to the generation of said pulse,
    comparing a command signal with said sweeping voltage signal to produce a gate signal upon detection of a comparison between said command signal and said sweeping voltage signal, and triggering said thyristor in response to said gate signal.

11. The method recited in claim 10 wherein said predetermined phase shift is a 180 degree phase shift.

12. The method recited in claim 10 wherein the step of passing said power signal through a low pass filter comprises passing said power signal serially through first and second filter sections each of which provides a 90 degree phase shift.

13. The method recited in claim 10 wherein said pulse is centered at said zero crossover.

14. A method for triggering a plurality of silicon controlled rectifiers (SCR's) relative to a zero crossover of a power signal, the method comprising the steps of:
passing said power signal through a low pass filter to produce a filtered power signal having a 180 degree phase shift,
generating a pulse at the zero crossover of said filtered power signal,
generating a sweeping voltage signal in response to the generation of said pulse,
receiving a command signal having a variable amplitude for regulating the power transmitted through said SCR's,
comparing said command signal and said sweeping voltage signal to produce a gate signal upon detection of a comparison of said command signal and said sweeping voltage signal,
generating a phase control signal for each of said SCR's, each of said phase control signals having an active state when the corresponding one of said SCR's is reverse biased,
generating a pulse train having a frequency greater than that of said power signal, and
passing said pulse train to said SCR's as a function of said gate signal and said phase control signals to trigger said SCR's.

15. The method recited in claim 14 wherein said step of generating a pulse comprises generating said pulse centered at said zero crossover.

16. The method recited in claim 14 wherein said step of generating a sweeping voltage signal comprises generating a precision ramp voltage signal.

17. A method for generating a controllable high voltage DC power signal for operating an electronic precipitator, the method comprising the steps of:
passing a power signal through a low pass filter to remove noise and phase shift said power signal by 180 degrees, thereby producing a filtered power signal,
generating a pulse at the zero crossover of said filtered power signal,
generating a sweeping voltage signal in response to said pulse,
receiving a command signal for controlling the amplitude of said high voltage power signal,
comparing said sweeping voltage signal to said command signal to generate a gate signal upon detecting a comparison of said command signal and said sweeping voltage signal,
generating a pulse train having a frequency greater than said power signal,
passing said pulse train to trigger an SCR in response to said gate signal thereby passing a second power signal through said SCR,
passing said second power signal from said SCR through a step-up transformer to produce a high voltage AC power signal, and
rectifying said high voltage AC power signal to produce said high voltage DC power signal which is supplied to the input terminals of said precipitator.

* * * * *